United States Patent [19]

Gabriele et al.

[11] 3,992,710

[45] Nov. 16, 1976

[54] TARGET TRACKER HAVING TARGET RECOGNITION MEANS

[75] Inventors: Thomas L. Gabriele, Timonium; Francis J. Willey, III, Catonsville, both of Md.; Charles W. Ziegler, Ann Arbor, Mich.

[73] Assignee: The United States of America as represented by the Secretary of the Navy, Washington, D.C.

[22] Filed: Feb. 22, 1973

[21] Appl. No.: 335,205

[52] U.S. Cl. .......................... 343/16 M; 343/5 SA; 343/7 A; 343/7.3
[51] Int. Cl.² .......................................... G01S 9/22
[58] Field of Search ............... 343/5 SA, 7.3, 16 M, 343/7 A, 11 R, 113 R

[56] References Cited
UNITED STATES PATENTS

| | | | |
|---|---|---|---|
| 2,717,999 | 9/1955 | Lewinstein | 343/7.3 |
| 3,449,749 | 6/1969 | McEvoy | 343/113 R |
| 3,495,245 | 2/1970 | Leyde | 343/7.3 |
| 3,516,051 | 6/1970 | Arberman et al. | 343/7.3 |
| 3,648,286 | 3/1972 | Schoneborn | 343/7.3 |
| 3,725,928 | 4/1973 | Klimchak | 343/5 SA |

Primary Examiner—Malcolm F. Hubler
Assistant Examiner—S. C. Buczinski
Attorney, Agent, or Firm—R. S. Sciascia; Paul S. Collignon

[57] ABSTRACT

A monopulse radar system having automated target identification capability. A first target recognizer, which can recognize a desired target by its radar signature, is used to improve direction finding performance by accurate placement and reduction in size of a receiver range gate. An additional target recognizing means is provided and allows integration of the return signal only if the signature of that return has been recognized as characteristic of the desired target.

4 Claims, 2 Drawing Figures

TARGET TRACKER HAVING TARGET RECOGNITION MEANS

BACKGROUND OF THE INVENTION

The present invention relates to a monopulse radar system designed to perform homing functions for a missile.

Airborne radar applications. utilizing monopulse techniques are widely used, particularly for military applications. Monopulse or simultaneous type radar systems are distinguished from sequential type systems by the derivation of the positional information from each reflected pulse rather than from a succession of reflected pulses. In one type of monopulse system, a pair of antennas are spaced apart in a plane so that the relative phase relationship of the reflected waves received by these antennas is utilized to provide the positional information for one coordinate.

Another known form of simultaneous, or monopulse, system is the so-called amplitude comparison system. This again utilizes a pair of antennas and receiver channels for each coordinate but has the antennas effectively located at a common point with their directive axes diverging from the common axis of the array. As is well-known to those skilled in the art, one coordinate of the target may be determined from a comparison of the relative amplitudes of the signals received by the antennas of each pair.

One problem encountered by all radar systems is that of detecting targets that are obscured by nearby clutter. In airborne radar systems which are used to provide homing for missiles, ground clutter presents a problem, as ground clutter can be greater than the radar cross section of the target and target echoes are embedded and lost in the ground clutter echoes.

Various schemes and devices are employed to overcome the problems presented by clutter. One such system is described in U.S. Pat. No. 3,392,387, which issued July 9, 1968, to George M. Kirkpatrick. In this patent, a system is described which utilizes monopulse technique to place a null in the elevation angle so as to reduce the ground clutter received by an airborne radar system. The monopulse null is caused to scan in elevation angle so as to maintain the null at the angle of arrival of the echo from clutter elements. As the transmitted range pulse sweeps outward along the ground and reflects from ground clutter, the null in the elevation plane scans through the elevation angles and the range display shows virtually no return. When a target is encountered displaced from the null direction no cancellation occurs and the range display shows the target.

SUMMARY OF THE INVENTION

The present invention relates to a system for improving beam splitting direction finding techniques in adverse clutter and multiple target environments by providing automated target identification. The most immediate and important application of the present invention is in terminal guidance of missile homing systems. The device of the present invention can restore an effective direction finding capability in multiple target and heavy clutter environments that would neutralize conventional direction finding methods.

In the present invention, a first target recognizer is provided with improves direction finding performance by accurate placement and reduction in size of the receiver range gate. There may be, however, distributed clutter within the same range interval as the desired target, and an additional target recognizing means is provided so that the return signal in the range gate is accepted for pulse to pulse integration only if the signature of that return has been recognized as characteristic of the desired target. The pattern recognizer accepts those signals that will produce valid monopulse outputs and ignores a difference channel signal for those returns which are more characteristic of the corrupting environment than of the desired target.

It is therefore a general object of the present invention to improve a monopulse radar system by providing target recognizing means that can distinguish a desired target.

Another object of the present invention is to adapt a monopulse radar system for accepting radar returns in only a narrow slant range interval and for differentiating a desired target from distributed clutter within the same range interval as the desired target.

DESCRIPTION OF THE PREFERRED EMBODIMENT

Figure 1:
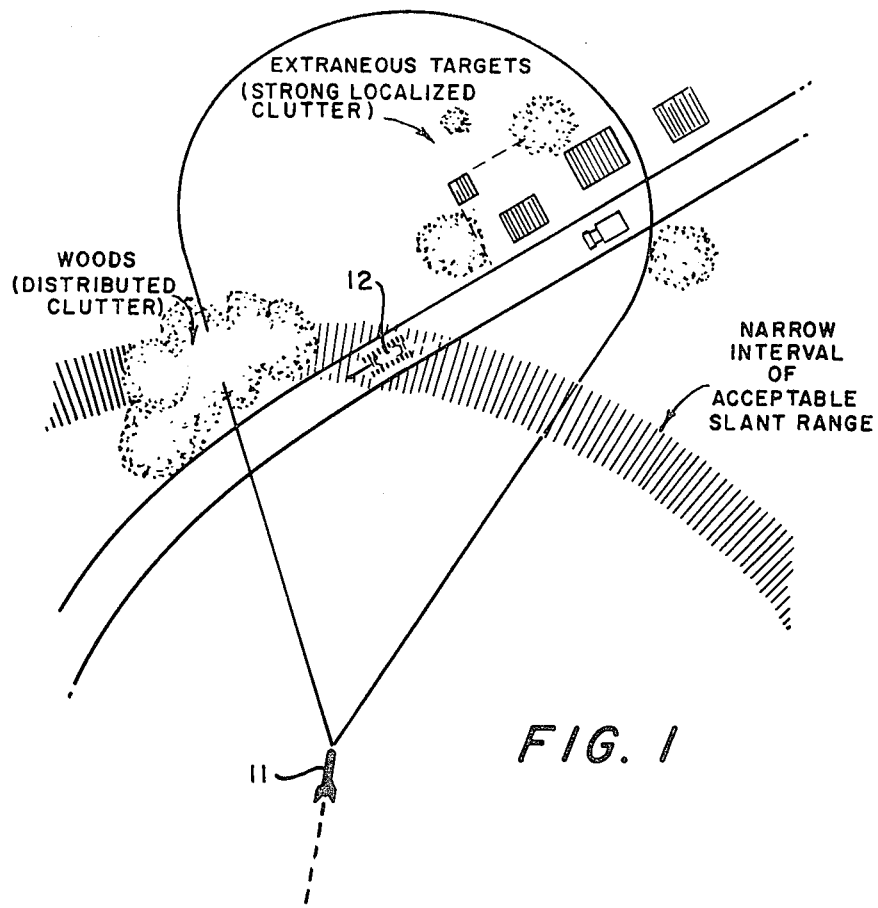
FIG. 1 is a diagrammatic view showing a target area viewed by a homing missile.

Referring first to FIG. 1 of the drawing, there is shown a missile 11 that has been launched against a desired target, such as a tank 12. In a typical combat situation, there may be other targets, such as cars, trucks, and buildings, and also the environment may be wooded and provide substantial ground clutter. The radar system of the present invention is designed to first identify a desired target, such as tank 12, and then provide for accurate placement and reduction in size of the receiver range gate. Additionally, the radar system accepts the return signal in the range gate for pulse integration only if the signature of that return has been recognized as characteristic of the desired target. A pattern recognizer is provided which accepts those signals that will produce valid monopulse outputs and ignores those returns which are more characteristic of the corrupting environment than of the desired target.

Figure 2:
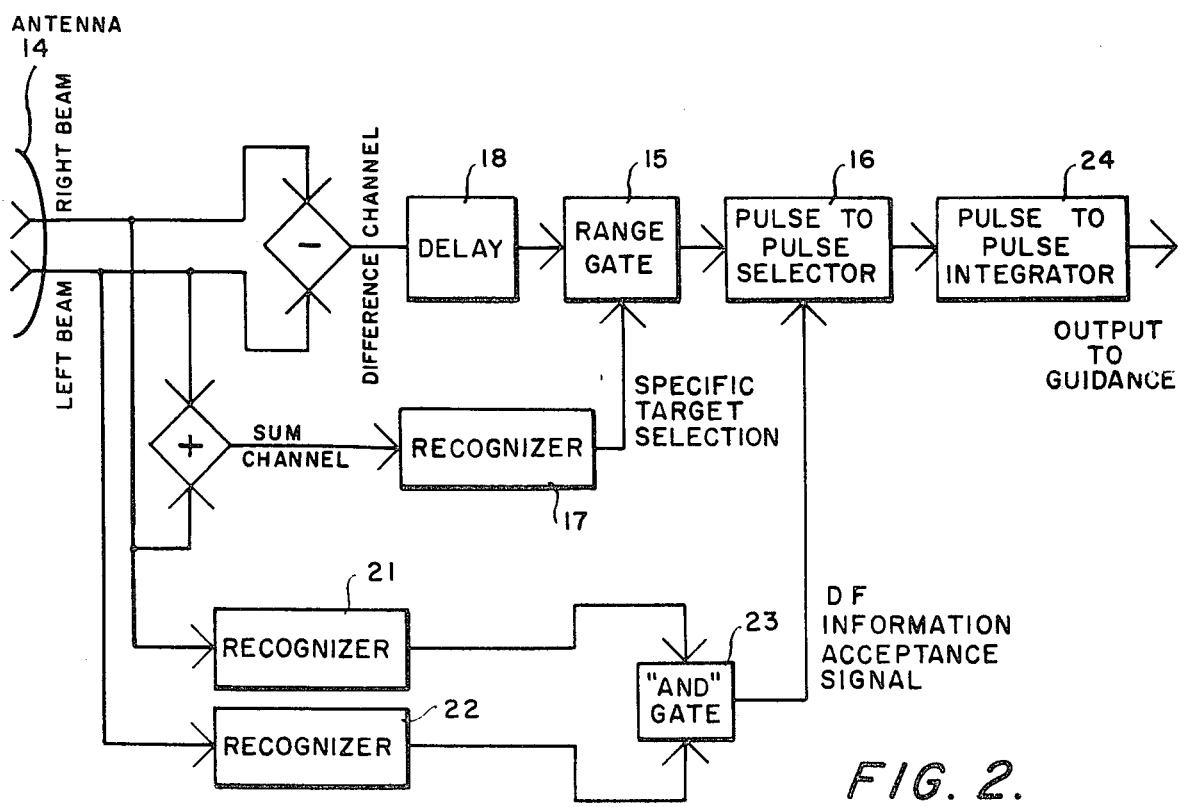
FIG. 2 is a schematic view of a radar system of the present invention.

Referring now to FIG. 2 of the drawing, there is shown, in block diagram, a basic monopulse radar system which has incorporated therewith certain improvements to enhance its tracking and homing functions for missile 11. Monopulse radar systems are well-known in the art and, accordingly specific circuitry and hardware have not been shown. A description of monopulse tracking techniques is provided in the text, "Introduction To Radar Systems", by Merrill I. Skolnik, published by McGraw-Hill Book Company, Inc. (1962). Also descriptions of monopulse techniques are described in U.S. Pat. No. 3,317,910, "Monopulse Radar Apparatus", which issued May 2, 1967, to Walter Hausz, and in U.S. Pat. No. 3,392,387, entitled, "Clutter Attenuation Radar", which issued July 9, 1968, to George M. Kirkpatrick.

As the beamwidth in most missile radars is wide with respect to the angle subtended by the target, the angular accuracy required for terminal guidance must be obtained by some method of beamsplitting which, in turn, is integrated with the target recognition process. By way of example, the feed system for antenna 14 might consist of a pair of open ends of waveguides mounted side by side with horizontal polarization, and combined in a magic tee type hybrid to provide sum and different ports for the monopulse system. A vertical dipole can be mounted between the two waveguides to receive the vertical polarized component of a return signal. The transmit pulse can be coupled into a sum channel arm of the hybrid by a circular thereby providing transmit-receive isolation. Traveling wave tube amplifiers can be used in the sum and difference channels RF amplifiers. To obtain the horizontally polarized component of the signal, a sampler can be used to couple the sum channel signal to a balanced mixer and the signal can then be amplified. The vertical video can be derived from the dipole through a balanced mixer, IF amplifier and detector, and bandpass filters can be employed in the sum and difference channels is image reject filters. A level set attenuator and phase shifter can be installed in the difference channel to compensate for taking the horizontal video from the sum channel. The sum and difference channels can be combined in a quadrature hybrid which phase and amplitude being adjusted between the antenna feed and the combination hybrid to form left and right beam signals at the output of the hybrid. Balanced mixers and identical gain IF amplifiers and detectors can be utilized on the outputs of the monopulse detection hybrid. An IF sample can be coupled out of the horizontal video before the detector and further processed by a narrow band amplifier, bandpass filter and detector to provide a means for monitoring IF frequency.

The local oscillator which is normally employed in an amplitude-comparison-monopulse radar might consist of an avalanche diode osciallator with level set attenuator, isolator, and hybrid power dividers. Tuning can be accomplished by both mechanical and electrical means.

The range gate generator, by way of example, might be a combination analog and digital device. The master timing pulses for the radar system come from the detected and shaped transmitter pulse, or can come from a test generator. The master timing pulses enter the course delay portion of the circuit both at a monostable multivibrator and at a fast clock counter circuit. The output of the counter circuit is gated together with the output of the monostable to produce a single stable pulse. Course delay can be accomplished by selecting a resistor with a single pole multi-through switch.

Radar video can be fed into a wideband oscilloscope display which presents three radar returns on two traces. These signals are the sum receiver channel return, which is horizontally polarized, the vertically polarized receiver output, and the video from a right-/left difference channel, which provides antenna pointing information.

The foregoing description of radar hardware is included for illustration purposes only and is not illustrated by a drawing as amplitude-comparison-monopulse radar systems are well-known in the prior art. For example, in the above-referenced text by Skolnik, block diagrams of monopulse radar systems are shown and described on pages 177 and 178.

Referring still to FIG. 2 of the drawing, it can be seen that signals from a difference channel are fed through range gate 15 to a pulse-to-pulse selector 16. Signals from a sum channel are fed into range gate 15 through a target recognizer 17. A delay 18 is introduced in the difference channel and provides a time delay equal in length to the time length of recognizer 17. Recognizer 17 identifies a target by recognizing its radar signature and by separating this signature from background clutter and the signatures of other identifiable targets. By way of example, recognizer 17 might be a hyperplane recognizer of the type disclosed in U.S. patent application Ser. No. 174,573, entitled, "Multiple Hyperplane Recognizer", filed Aug. 5, 1971, by Erik Rosenbaum et al.

The multiple hyperplane recognizer is a radar signature recognizer. The radar return signal is returned to a tapped delay line. A series of weights are attached to each tap in the delay line and these weights scale that signal at each tap point. The weights connected to each tap are determined in accordance with the learning algorithm carried out by a computer. The learning algoithm involves acquiring feature data from known classes of radar signatures. The weights are initially chosen and a pattern is selected for training the computer. New weights values are then recalculated and this process is continued until a minimum number of errors are detected in recognizing and selecting the desired pattern from among other patterns in the radar signature. The scaled signals from each delay line tap are summed and sent to a threshold device. In the event the sought recognized target signature is contained in the radar signal the threshold device will be triggered, generating a signal to indicate the presence of the sought signature. The threshold signal is then "AND" gated with other threshold signals to generate an output indicating the presence of the pattern.

The output from recognizer 17 is fed into range gate 15 and improves direction finding performance by accurate placement and reduction in size of the receiver range gate. A second recognition system consisting of recognizers 21 and 22 and AND gate 23 are provided, as shown in FIG. 2 of the drawing, and the output from AND gate 23 is fed into pulse-to-pulse selector 16. The return signal in range gate 15 is accepted for pulse-to-pulse integration by integrator 24 only if the signature of the return is recognized by the second recognition system as being characteristic of the desired target. In this manner, signals that will produce valid monopulse outputs will be accepted and difference channel signals for those returns which are more characteristic of the corrupting environment than of the desired target will be ignored.

In operation, one important use of the present invention would be for terminal guidance of missile homing systems wherein the radar system can restore an effective direction finding capability in multiple target and heavy clutter environments that would neutralize conventional direction finding methods. The first target recognizer 17, which receives its input from the sum channel improves performance by accurate placement and reduction in size of the receiver range gate. The second target recognizer system consisting of recognizers 21 and 22 are provided so that the return signal in the range gate is accepted for pulse-to-pulse integration only if the signature of that return has been recognized as characteristic of a desired target.

Obviously, many modifications and variations of the present invention are possible in the light of the above teachings. It is therefore to be understood that within the scope of the appended claims the invention may be practiced otherwise than as specifically described.

We claim:

1. In a monopulse radar system having antenna means for transmitting two displaced antenna beams with a common boresight, the combination comprising,
   first receiver means connected to said antenna means for receiving echo signals from one of said beams,
   second receiver means connected to said antenna means for receiving echo signals from the other said beam,
   means for subtracting said received echo signals,
   a range gate connected to the output of said means for subtracting said received echo signals,
   a pulse to pulse selector connected to the output of said range gate,
   integration means connected to the output of said pulse to pulse selector,
   first target recognizing means connected to said range gate for accurate placement and reduction of size of said range gate when said first target recognizing means recognizes said echo signals to be characteristic of a desired target, and
   second target recognizing means connected to said pulse to pulse selector for accepting the output of said range gate for integration only when said second target recognizing means recognizes said echo signals to be characteristic of a desired target.

2. In a monopulse radar system as set forth in claim 1 having means for adding said received echo signals and wherein an input of said first target recognizing means is connected to an output of said means for adding said received echo signals.

3. In a monopulse radar system as set forth in claim 2 wherein said first target recognizing means is a hyperplane recognizer.

4. In a monopulse radar system as set forth in claim 1 wherein said second target recognizing means includes a first hyperplane recognizer having an input connected to said first receiver and a second hyperplane recognizer having an input connected to said second receiver with the outputs of said first and second hyperplane recognizers being connected to said pulse to pulse selector through an AND gate.

* * * * *